United States Patent
Trojahner

(10) Patent No.: US 12,325,450 B2
(45) Date of Patent: Jun. 10, 2025

(54) SYSTEMS AND METHODS FOR GENERATING MULTILEVEL OCCUPANCY AND OCCLUSION GRIDS FOR CONTROLLING NAVIGATION OF VEHICLES

(71) Applicant: FORD GLOBAL TECHNOLOGIES, LLC, Dearborn, MI (US)

(72) Inventor: Kai Trojahner, Munich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 17/821,550

(22) Filed: Aug. 23, 2022

(65) Prior Publication Data

US 2023/0056589 A1 Feb. 23, 2023

Related U.S. Application Data

(60) Provisional application No. 63/235,993, filed on Aug. 23, 2021.

(51) Int. Cl.
| | | |
|---|---|---|
| *B60W 60/00* | (2020.01) | |
| *B60W 40/08* | (2012.01) | |
| *B60W 40/09* | (2012.01) | |

(52) U.S. Cl.
CPC ........ *B60W 60/0016* (2020.02); *B60W 40/09* (2013.01); *B60W 2040/0881* (2013.01); *B60W 2540/01* (2020.02)

(58) Field of Classification Search
CPC ............. B60W 60/0016; B60W 40/09; B60W 2540/01; B60W 2040/0881

USPC .......................................................... 701/23
See application file for complete search history.

(56) References Cited

U.S. PATENT DOCUMENTS

| | | | | |
|---|---|---|---|---|
| 7,769,491 | B2 * | 8/2010 | Fukuchi | G05D 1/0251 |
| | | | | 701/1 |
| 8,260,539 | B2 * | 9/2012 | Zeng | G01S 7/4808 |
| | | | | 701/301 |
| 8,744,744 | B2 * | 6/2014 | Takagi | G01S 17/89 |
| | | | | 701/301 |
| 9,208,612 | B2 * | 12/2015 | Frahm | G06T 15/06 |

(Continued)

OTHER PUBLICATIONS

Kim, C. et al., A Geodetic Normal Distribution Map for Long-Term LiDAR Localization on Earth, IEEE Access, Dec. 25, 2020.

(Continued)

*Primary Examiner* — Fadey S. Jabr
*Assistant Examiner* — Ahmed Alkirsh
(74) *Attorney, Agent, or Firm* — Frank A. MacKenzie; Brooks Kushman P.C.

(57) ABSTRACT

This document discloses methods of acquiring a 3D map of an area with multiple heights. The 3D map may include tiles, each of which provides ground height information for one or more of the plurality of levels. A grid corresponding to the 3D map is generated. The grid may divide each of the plurality of tiles into a plurality of cells, The grid may include: (a) a unique index assigned to each of the plurality of cells, in which the unique index is convertible to an index of a tile of the 3D map in which that cell is included, and (b) a plurality of gridlets associated with each of the plurality of cells, wherein a number of the plurality of gridlets associated with a cell is equal to a number of height levels represented by a tile of the 3D map in which that cell is included.

18 Claims, 6 Drawing Sheets

(56) References Cited

U.S. PATENT DOCUMENTS

| | | | | |
|---|---|---|---|---|
| 9,404,756 | B2* | 8/2016 | Fong | G05D 1/0246 |
| 9,823,661 | B2* | 11/2017 | Pink | G08G 1/16 |
| 11,513,519 | B1* | 11/2022 | Akella | G05D 1/0276 |
| 2012/0274633 | A1* | 11/2012 | Ivanov | G01C 21/3881 |
| | | | | 345/419 |
| 2018/0012494 | A1* | 1/2018 | Walessa | B60W 40/04 |
| 2019/0384302 | A1* | 12/2019 | Silva | B60W 60/00272 |
| 2019/0384309 | A1* | 12/2019 | Silva | G01S 17/89 |
| 2020/0003901 | A1* | 1/2020 | Shroff | G06T 17/20 |
| 2020/0103523 | A1* | 4/2020 | Liu | G01S 13/87 |
| 2021/0201570 | A1* | 7/2021 | Yu | G06T 7/593 |
| 2022/0289237 | A1* | 9/2022 | Vu | G01S 17/89 |

OTHER PUBLICATIONS

Sless, L. et al., Road Scene Understanding by Occupancy Grid Learning from Sparse Radar Clusters using Semantic Segmentation, General Motors, Advanced Technical Center, Israel, Sep. 2, 2019.

* cited by examiner

SYSTEMS AND METHODS FOR GENERATING MULTILEVEL OCCUPANCY AND OCCLUSION GRIDS FOR CONTROLLING NAVIGATION OF VEHICLES

CLAIM OF PRIORITY

This patent application claims the benefit of U.S. Provisional Patent Application No. 63/235,993 filed Aug. 23, 2021, which is incorporated herein by reference in its entirety.

BACKGROUND

Modern vehicles, and especially autonomous vehicles (AVs), include a variety of sophisticated electronic systems for collision avoidance and navigation assistance. In some vehicles, these systems include object detection and adaptive cruise control systems, which sense objects around a vehicle to accurately identify free or drivable areas and areas that are occupied by an object. Likewise, a vehicle must be able to identify areas that are reliably covered by its sensors and areas that are occluded to the sensors.

In order to generate a traveling route in an environment where multiple objects exist, an occupancy grid map (grid map) is often used that divides the space into discrete cells, each cell including a probability and/or an indication of whether that cell is occupied by an object. When the cells also include occlusion information relating to whether a vehicle sensor can obtain sensory information relating to that cell, an occupancy and occlusion grid is obtained.

Current occupancy and/or occlusion grids assume that the traffic infrastructure is two-dimensional (2D)—i.e., flat. However, in the real-world, traffic infrastructure can include multiple levels. For example, traffic occurs on multiple levels with ramps transitioning between the infrastructure at different level such as with bridges, overpasses, and tunnels, etc.

This document describes methods and systems that are directed to addressing the problems described above, and/or other issues.

SUMMARY

In various embodiments, this document describes method, system and computer program product embodiments for acquiring a 3D map of a geographic area comprising a plurality of height levels. The 3D map may include a plurality of tiles, each of which provides ground height information for one or more of the plurality of levels. The method may include generating a grid corresponding to the 3D map. The grid may divide each of the plurality of tiles into a plurality of cells, The grid may include: (a) a unique index assigned to each of the plurality of cells, in which the unique index is convertible to an index of a tile of the 3D map in which that cell is included; and (b) a plurality of gridlets associated with each of the plurality of cells, wherein a number of the plurality of gridlets associated with a cell is equal to a number of height levels represented by a tile of the 3D map in which that cell is included. The method also may include saving the grid to a map data set.

DETAILED DESCRIPTION

Figure 1:
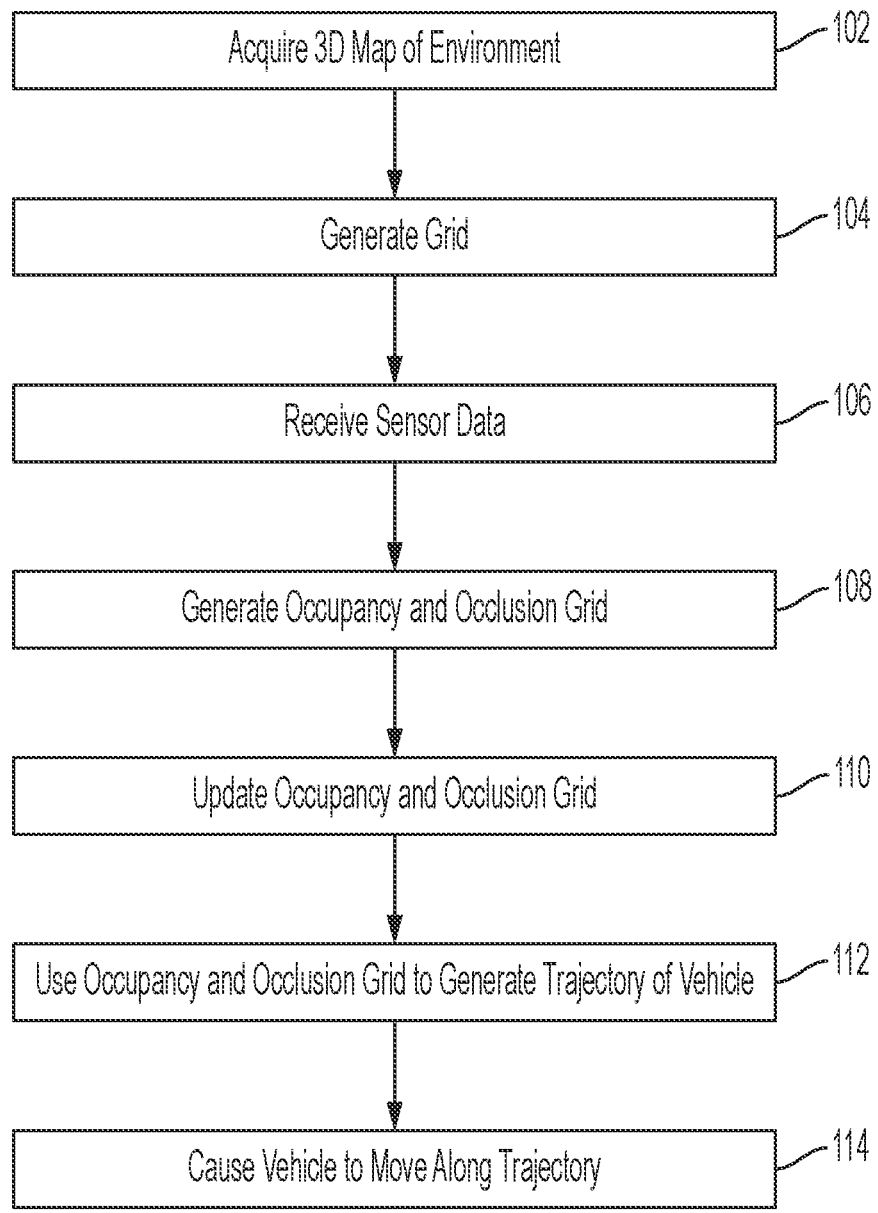
FIG. 1 illustrates an example process for generating an occupancy and occlusion grid for a geographical area.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

Inferring the drivable area in a scene is a fundamental part of road scene understanding. This task may include occupancy grid mapping that is used for generating an estimation of free and occupied spaces from sensor data. Occupancy grid maps partition the space in front or around the vehicle into a grid, where each grid cell is represented by a random variable corresponding to the occupancy of the location it covers.

In addition, a vehicle relies on sensory inputs from sensors to gather information about its environment for, for example, detection and classification of obstacles and impassable terrain, and creation of occupancy grids. These sensors provide data representing 3D space surrounding the vehicle. While many sensor processing algorithms focus on what is explicitly presented in the sensor data, information may also be garnered by what is inferred by the data. For example, occlusions where sensor data is obscured by dust, precipitation, objects, or terrain, producing gaps in the sensor field of view can fall into this category. Specifically, occlusions can be defined as a blockage which prevents a sensor from gathering data in a location. (e.g., shadows in LiDAR data). While the sensor data itself does not indicate what is in the occluded areas, gaps or occlusions can represent negative obstacles such as drop-offs, rough terrain or areas behind large obstacles. These areas are important to identify for autonomous vehicle obstacle detection and avoidance to work properly. Occlusion grid maps partition the space in front or around the vehicle into a grid, where each grid cell is represented by a random variable corresponding to the sensor occlusion of the location it covers.

Occupancy and occlusion information may be included in the same grid to generate occupancy and occlusion grids. However, as discussed above, prior art occupancy and occlusion grids are 2D, and do not take into account the multi-level nature of traffic infrastructure such as bridges, overpasses, tunnels, etc. Rather, current 2D occupancy and occlusion grids project structures above a roadway, such as bridges and overpasses, onto the 2D occupancy and occlusion grid or plane. This results in the 2D occupancy and occlusion grid falsely identifying a particular grid cell or cells as occupied or occluded, even though the area represented by those cells does not contain any pertinent structures, and thus any sensor data, along the roadway that would be useful for the various applications mentioned above. There is, therefore, a need to continue to enable accurate localization and mapping along all portions of a roadway, even though structures may be built above the roadway. Example aspects of this disclosure are directed to the generation of a multi-level occupancy and occlusion grid in which each grid cell represents the probability and/or an indication of occlusion of that cell from one or more sensors mounted on the vehicle and/or a probability/indication of being occupied by an object at each level of a multi-level map that represents the vehicle's environment.

Specifically, this disclosure is directed to techniques for controlling a vehicle, such as an autonomous vehicle, based on identification of occluded and/or occupied areas in an environment. For example, an occluded and/or occupied area can be represented by an occlusion and occupancy grid, which may be stored in connection with map data or can be dynamically generated based on obstacles in an environment. An occupancy and occlusion grid can include a plurality of cells, which can represent discrete areas of an environment, such as drivable surfaces. In some examples, a cell can indicate an occlusion state (e.g., indicating whether the location is visible to one or more sensors of an autonomous vehicle where a location may be occluded when sensor data is unavailable, unreliable, etc. for that location) and an occupancy state (e.g., indicating whether the location is occupied by an object such as a vehicle, pedestrian, animal, etc.). In at least some examples, the occupancy state may further comprise an "indeterminate" state, where based on the available data, it may be currently unknown whether the cell is occupied or not. In some cases, the occlusion state and/or occupancy state can be determined using data captured by sensors on the autonomous vehicle (e.g., LIDAR data and/or image data). The occlusion states and occupancy states can be determined for all cells of an occupancy and occlusion grid. In some examples, when the cells are all visible and unoccupied, the occupancy and occlusion grid can be considered clear, and the autonomous vehicle can be controlled to traverse the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or combinations thereof.

FIG. 1 is a flow diagram illustrating a process by which a computing system may generate an occupancy and occlusion grid. The computing system may be a stand-alone system that receives and processes sensor data captured by vehicles, or the computing system may be an on-board component of one of more of the vehicles themselves.

The system starts at 102 by acquiring a 3D map of an environment of an autonomous vehicle. The system may receive the 3D map from a data store such as, for example, a map data store. At least a portion of the map may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like.

In some embodiments, the map may include a road network map pertaining to the environment. A road may include one or more adjacent lanes, which may be divided by lane markings and are intended for a single line of traffic. Lanes may be split longitudinally at lane segments, sometimes at locations meaningful for motion planning (such as the start/end of an intersection) and/or at other locations that may not be meaningful for motion planning as an artifact of the map generation process. As used in this disclosure, a "lane segment" refers to a mapping construct that is associated with a segment of road. The roads in the road network may include one or more lanes. The lanes may be divided into a plurality of lane segments, and each lane segment may have an associated direction of travel. The road network map may also include intersections which include a lane segments that connect different roads or navigable areas. In addition, the map also includes information for estimating a ground height of various points on the map (e.g., a road map and/or a ground height map).

Optionally, the 3D map may be a tile map partitioned into coarse-grained tiles of size tilesize$_m$, where each tile provides ground height information for one or more road network levels represented in the map at that tile location (where each level has a defined height above ground). In such maps, each tile is uniquely addressed on the map by a discrete 2D tile index (index$_{tile}$) that identifies different parts of the map (e.g., by row and column). The tile and/or the 2D tile index may include ground height information for the corresponding map level(s). However, level indexing may not be consecutive or ordered by height. For example, levels may have holes such that a level need not provide a ground height for all (x, y) positions in the tile. Various embodiments can define such a 3D map using a grid on a 2D surface. The 2D surface can be defined as being at a particular height. Then, for each grid section (e.g., an indexed polygon), the 3D map can have a map tile that defines a height at various points within that grid section. For example, the map tile can define the local coordinates within the grid section, and store a height value for each point within the local coordinate system of the grid section.

The map may also include detailed information about travel infrastructure in various such as road type (e.g., highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, as some non-limiting examples.

In some embodiments, receiving the map may include transcoding or reformatting the map information, storing the reformatted map information, or both. For example, the map information may be used to create a graph representation of a road network as a vector map, a curvilinear map, a Cartesian map, a tile map, or the like.

At 104, the system may generate a grid (or receive a previously stored grid) corresponding to the 3D map area, which represents the area around the autonomous vehicle as a cell grid around a center point (such as, for example, the autonomous vehicle's location). The grid cells coincide with the 3D map tiles and follow the same indexing.

Specifically, the grid subdivides each tile of the 3D map into M discrete cells of size:

gridcellsize$_m$=tilesize$_m$/M along each axis, where M and gridcellsize$_m$ are constants.

Furthermore, discrete 2D grid indices may be used to uniquely address grid cells on the map. The system may compute the grid index of every point on the map using:

$$\text{index}_{grid}(\text{coord}_{map}) = \text{floor}(\text{coord}_{map}/\text{gridcellsize}_m)$$

A cell size for the grid may be arbitrary or may be suitable for desired sensor detection accuracy. Optionally, $M=2^N$ so that the above conversions may be efficiently implemented as bit operations (shift, and, or).

Additionally and/or alternatively, grid indices can be converted into pairs of tile indices and (intra-tile) cell indices using:

$\text{index}_{grid}(\text{index}_{tile}, \text{index}_{cell}) = \text{index}_{tile} * M + \text{index}_{cell}$ (or vice versa)

$\text{index}_{tile}(\text{index}_{grid}) = \text{div}(\text{index}_{grid}, M)$, and $\text{index}_{cell}(\text{index}_{grid}) = \text{mod}(\text{index}_{grid}, M)$.

To account for multiple levels, every cell and/or tile of the grid may be a column of gridlets, where the number of gridlets equals the number of ground height levels as recorded in the tile map. In other words, each grid cell has exactly one gridlet for every level in the corresponding tile of the 3D map. This allows the system to avoid computing a full set of levels for the entire grid during generation of the occupancy and occlusion grid.

In various embodiments, the system may create a grid data object for a 3D map section. A grid data object refers to a data representation of a grid. For example, a grid data object may be a data structure or other data construct. The system may assign a unique identifier to the grid data object. The unique identifier may be random or pseudo-randomly generated. Alternatively, the unique identifier may be sequentially or otherwise assigned by the system.

The system may add a listing of the cells, corresponding cell indices, gridlet information, scope area size (discussed below), and/or other information that form the grid in the grid data object. The listing may identify the cells by their unique cell indices. In addition, the system may store information relating to the 3D map in the grid data object.

The system may use the generated grid in a variety of ways such as, for example, for generation of an occupancy and occlusion grid.

The grid can be used to generate the occupancy and occlusion grid (as discussed below) where each cell in the grid is associated with a value (state, h) having a state (Occupied or Occluded), and a height h which is a non-negative number. In this model, an occupied cell is a cell that is occupied from the ground up to height h. An occluded cell is a cell that is occluded from the ground up to height h. In both cases, the space above height h is considered empty. Therefore, any cell with height 0 is considered empty.

Figure 2:
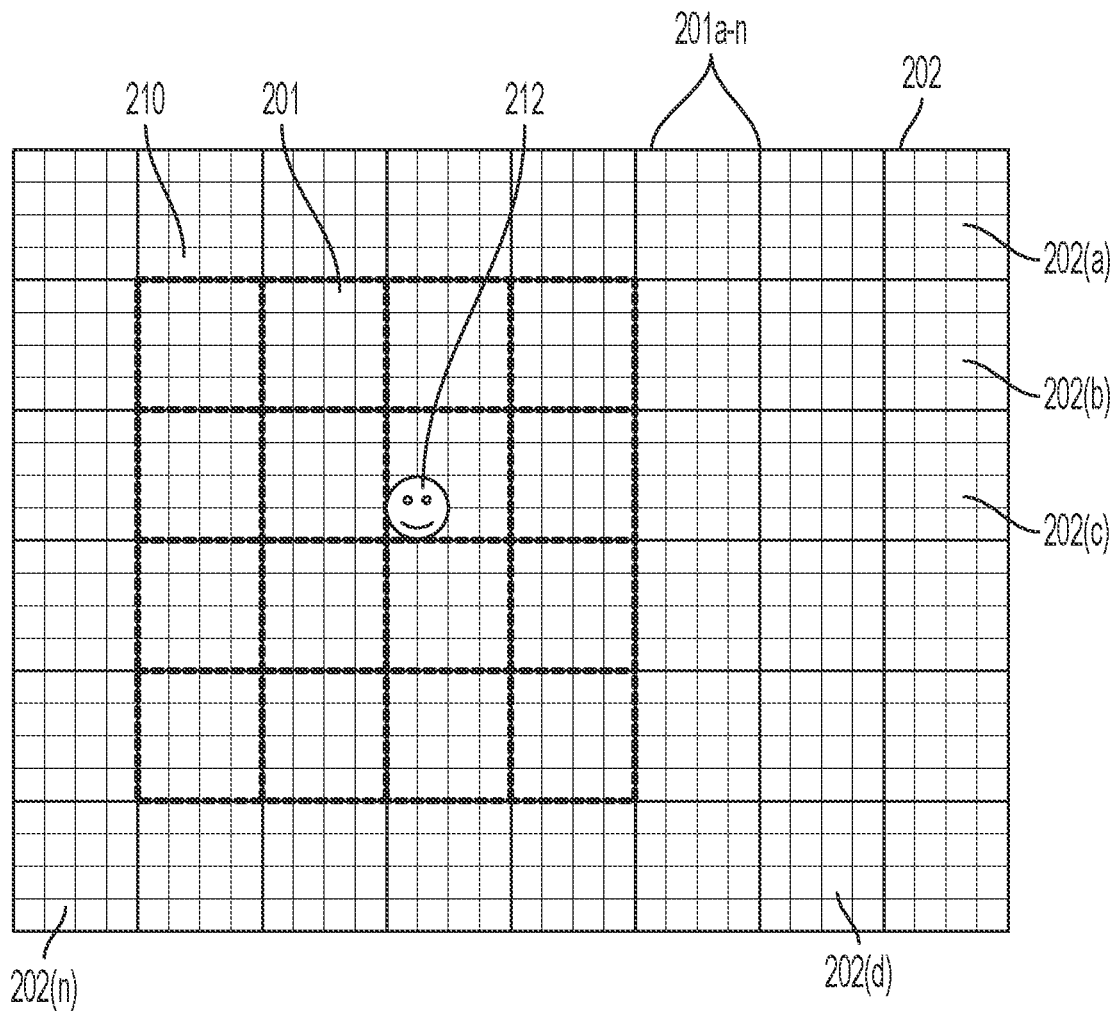
FIG. 2 illustrates an example scope area of a grid.

Optionally, the grid may include a scope area including gridsize$_{tiles}$*gridsize$_{tile}$ (e.g., a square scope area) tiles around a center location (such as, without limitation, the autonomous vehicle's location). As the autonomous vehicle navigates through the environment in the 3D map, the grid moves such that in each direction around the center point (i.e., the autonomous vehicle's location), there are (gridsize$_{tiles}$-1)/2 map tiles in the scope area of the grid. For example, as shown in FIG. 2, a grid 201 having M=4 is generated for a map area 202 including map tiles 202(a), 202(b), 202(c) . . . 202(n), such that each map tile includes 4 grid cells 201(a)-(n). The grid also includes a square scope area 210 of gridsize$_{tiles}$=4 around a center point 212 (i.e., the autonomous vehicle's location) such that there are 1.5 tiles in each direction around the center point 212.

In various implementations, when the grid moves (e.g., for different sensor frames, vehicle poses, vehicle locations, etc.) during generation of the occupancy and occlusion grid, only new tiles that enter the scope area may be populated with a new value for new information (e.g., both state and h). However, the h value of tiles that remain within the scope area may be preserved by efficiently moving these entire tiles inside the tile grid, while only new state information (based on sensor data) is determined. In other words, state information is computed based on the sensor data for each frame, including for tiles previously present within the scope area. However, h information for a new frame may only be computed for new tiles in the scope area (as discussed below).

At 106, the system may receive sensor data corresponding to the scope area from one or more sensors. The system can receive sensor data including information based at least in part on one or more sensor outputs associated with detection of one or more objects in an environment by one or more sensors of a vehicle. The one or more objects detected by the one or more sensors can include one or more vehicles, one or more pedestrians, one or more cyclists, one or more roads, one or more buildings, one or more features of a road, and/or one or more natural geographic formations. Further, the sensor data can be based at least in part on one or more sensor outputs associated with one or more physical features, properties, and/or attributes of the one or more objects. The one or more sensor outputs can be associated with the shape, location, position, orientation (e.g., compass bearing), velocity, acceleration, and/or physical dimensions (e.g., width, depth, and/or height) of the one or more objects and/or one or more portions of the one or more objects (e.g., a top portion of an object of the one or more objects in front of the vehicle).

In some embodiments, the one or more sensor outputs can be based at least in part on a three-hundred and sixty degree light detection and ranging (LIDAR) sweep by one or more LIDAR devices. For example, the vehicle computing system can receive one or more sensor outputs from a LIDAR device mounted on the roof of the vehicle and configured to rotate three-hundred and sixty degrees in order to capture LIDAR data associated with the environment surrounding the vehicle.

In some embodiments, the one or more sensors can include one or more light detection and ranging devices (LIDAR), one or more sonar devices, one or more radar devices, and/or one or more cameras (e.g., visual spectrum cameras and/or infrared cameras). For example, the vehicle computing system can receive one or more sensor outputs from a combination of sensors including one or more LIDAR devices and cameras.

In some embodiments, the one or more sensors can be positioned on the vehicle to provide a bird's eye view of the one or more objects. The bird's eye view position of the one or more sensors can facilitate the capture of information associated with one or more objects in the environment surrounding a vehicle.

The sensor data may be in the form of a point cloud that is formed of points or pixels, each of which may include an intensity and location data. The location data may be a three component coordinate (e.g., [x, y, z]) or a direction and a distance. The direction may be defined as a first angle from a two reference planes (e.g., [alpha, beta, distance]), or as a direction of travel. The reference planes may be a horizontal plane parallel to the surface of the Earth and a vertical plane perpendicular to the surface of the Earth.

The system may analyze the received sensor data to determine the occlusion state and/or occupancy state of cells on the grid (e.g., within the scope area) in order to generate the occupancy and occlusion grid (108).

In various embodiments, the sensor data (e.g., LIDAR data) can be ray casted to determine whether the sensor rays have traveled through the regions of space represented by the grid cells. This may include casting rays from the point of view (i.e., sensor location) to different directions and finding intersections with the grid. The first intersection of a ray with the grid yields an occupied cell (impact point). Any other intersection of the same ray is hidden by the first one (i.e., occluded). As such, the method follows each ray from the origin until an intersection has been found or a maximum distance has been reached. Each cell that falls in the path of the ray between the origin and the impact point may be considered to be occluded up to the height of the ray. As such, each ray may be associated with a z-coordinate that is used to determine the level and/or gridlet that is affected by the ray as well as the height above ground h. In addition, the ray can be extended to the maximum distance (beyond the impact point) and every cell that falls within the path of the extended ray can be marked as occluded. When using the ray tracing method with the a point cloud, each point in the point cloud corresponds to one impact point, and the origin is always the sensor origin (i.e., the autonomous vehicle when the sensor is mounted on the autonomous vehicle).

Optionally, the system may assign values (state, h) to each grid cell within the scope area. Specifically, for each point in the sensor data (e.g., point cloud data where each point has a location x, y, z), the system may use a 2D line drawing algorithm to cast a ray, through the grid space, between the sensor origin and the point (i.e., the impact point at location x, y). The system may then assign an "occupied" state to the cell that includes the impact point up to a height h (above ground) determined for that cell. As discussed above, each cell that the ray traverses is further marked as having an "occluded" state up to a corresponding height h.

The height h for the occupied cell can be determined using the value of the z coordinate of the impact point. As will be understood, z is a function of both the gridlet (i.e., map tile level) and the height above ground (HAG). As such, the system may specify a function HAG that determines the level and the height above ground of the ray at a cell as follows: HAG (index$_{cell}$, z)=(level, h), where h=z−height (level, index$_{cell}$)) and level is chosen such that h is minimal, yet positive. For example, if an impact point having a z-coordinate of 512 m. is included within gridlet of a cell of the grid that corresponds to level 1 of a tile map having a known height above ground of 511 m., the system may determine that the cell has a height above ground of 1 m. (512 m.−511 m.). As such the grid cell including the impact point may be assigned the following value: (occupied, 1 m.). In addition, the system may use the z coordinate of the impact point to assigns a z coordinate to pixels of the ray in every grid cell that the ray traverses (i.e., ray height at every point/pixel), and use the ray height to determine the h for the occluded cells using the above function. Implementing HAG requires information from the ground height tile map, and is typically invoked highly frequently (for every pixel of every ray cast to a sensor point).

Figure 3:
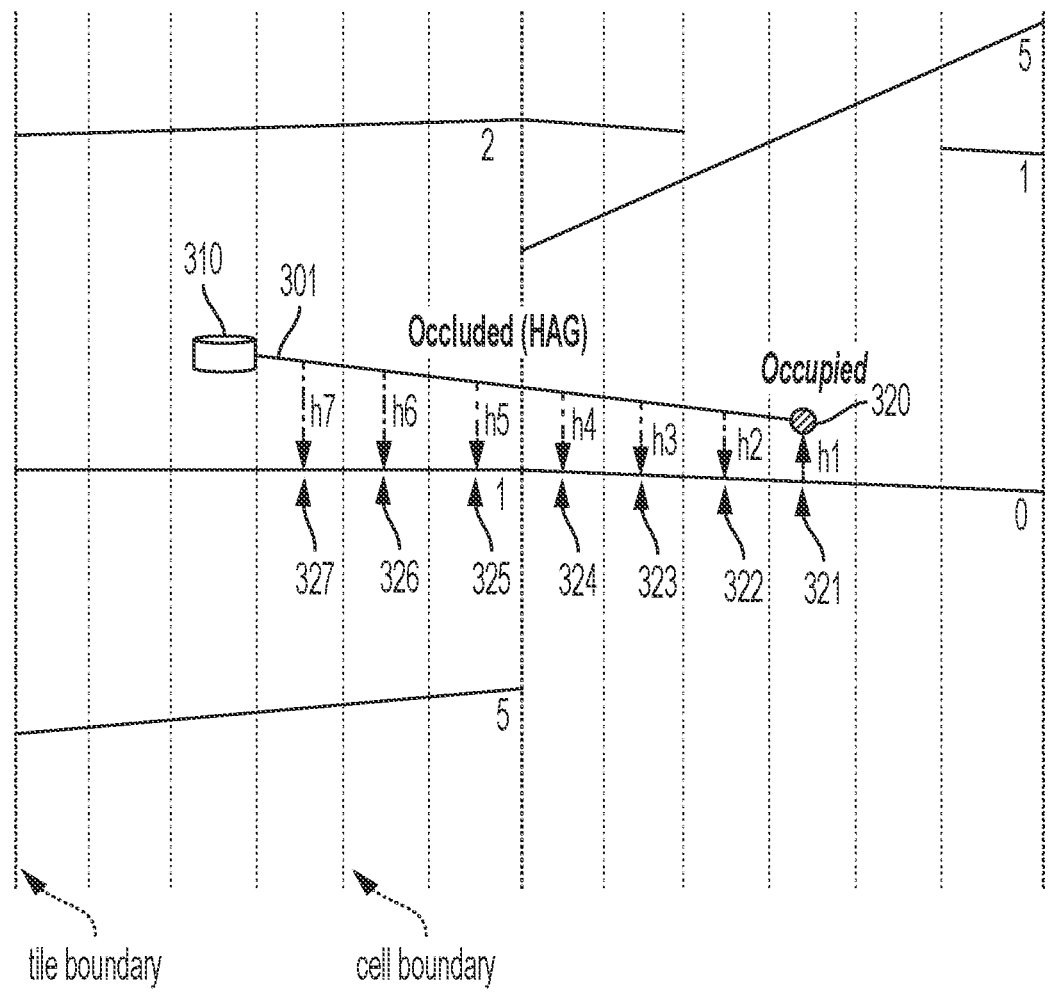
FIG. 3 illustrates an example ray cast for generating status values of grid cells during generation of an occupancy and occlusion grid.

An example occupancy grid is shown in FIG. 3. As shown in FIG. 3, a ray 301 is cast between an origin 310 and an impact point 320, and the grid cell 321 including the impact point is assigned a value (occupied, h1). The grid cells that the ray 301 traverses (i.e., cells 322, 323, 324, 325, 326, and 327) are each assigned a value including an occluded state at heights h2, h3, h4, h5, h6, and h7, respectively. Heights h1 is calculated for tile map level 0 and based on the z coordinate of the impact point 320, heights h2, h3, and h4 are calculated for tile map level 0 and based on the z coordinate of the ray in cells 322, 323, and 324 (determined based on origin location and z-coordinate of the impact point), and heights h5, h6, and h7 are calculated for tile map level 1 and based on the z coordinate of the ray in cells 325, 326, and 327 (determined based on origin location and z-coordinate of the impact point).

As discussed above, an occupied cell is a cell that is occupied from the ground up to height h. An occluded cell is a cell that is occluded from the ground up to height h. In both cases, the space above height h is considered empty. Therefore, any cell with h=0 is considered empty.

In certain embodiments, the grid cells may be hit and/or traversed by many rays. In such cases, the system may resolve the conflict between values determined for the cell based on individual rays by either returning the highest occupancy height and/or the lowest occlusion height. If there is a conflict between a ray that hits the cell and another ray that traverses the cell, the value of the cell is determined to be occupied at the height the ray hits the cell (i.e., conflicts are resolved in favor of occupancy over occlusion). For example, if the value of cell is determined to be (occupied, h1) based on a first ray that hits the cell and (occupied, h2) based on a second ray that hits the cell, the system may determine the value of the cell as having an occupied state up to a height value (h) that is the higher value amongst h1 and h2. In another example, if the value of cell is determined to be (occluded, h1) based on a first ray that traverses the cell and (occluded, h2) based on a second ray that traverses the cell, the system may determine the value of the cell as having an occluded state up to a height value (h) that is the lower value amongst h1 and h2. In yet another example, if the value of cell is determined to be (occluded, h1) based on a first ray that traverses the cell and (occupied, h2) based on a second ray that hits the cell, the system may determine the value of the cell as having an occupied state up to a height value (h2). These rules may be implemented using the following functions:

$$\text{join}((\text{Occupied}, h_1), (\text{Occupied}, h_2)) = (\text{Occupied}, \max(h_1, h_2))$$

$$\text{join}((\text{Occupied}, h_1), (\text{Occluded}, h_2)) = (\text{Occupied}, h_1)$$

$$\text{join}((\text{Occluded}, h_1), (\text{Occupied}, h_2)) = (\text{Occupied}, h_2)$$

$$\text{join}((\text{Occluded}, h_1), (\text{Occluded}, h_2)) = (\text{Occluded}, \min(h_1, h_2))$$

Optionally, if the occluded cells are represented as negative numbers and occupied cells as positive numbers, the join can be efficiently implemented as: $\text{join}(c_1, c_2) = \max(c_1, c_2)$. In another example, if the occluded cells are represented as positive numbers and occupied cells as negative numbers, the join can be efficiently implemented as: $\text{join}(c_1, c_2) = \min(c_1, c_2)$.

This results in an occupancy and occlusion grid in which grid cells that contain a sensor point at height h above ground are marked as (Occupied, h). Cells that are traversed by a ray at a height h above the ground are marked as (Occluded, h), because there may still be an occupancy below h. The occupancy and occlusion grid of the current disclosure supports multiple levels of traffic infrastructure but avoids performing computations for a full set of levels for the entire grid. Instead, each grid tile has exactly one gridlet for every level in the corresponding tile of the ground height map. As such the proposed solution more memory efficient than an actual 3D representation of the volume (e.g., in the form of voxels). In addition, the current disclosure uses a global cell coordinate system whose origin is at a fixed position in map space. More specifically, an absolute coordinate system is divided into a grid (or mesh) of equal cells where, for convenience, the origin of the absolute coordinate system is set to a position of the vehicle at a certain time t=0. It should be noted that the absolute coordinate system as used in the present embodiment is a specific coordinate system where the origin may be set to an arbitrary position, and the X- and Y-axes may be set in arbitrary directions. Therefore, there is no direct correspondence between the above absolute coordinate system and the latitude-longitude coordinate system. Each cell is uniquely identified by a global index from which the cell's tile index and corresponding intra-tile index can be efficiently computed, which in turn provides an efficient method of combining cell contents. The occupancy and occlusion grid representation of the current disclosure, therefore, lends itself very well for sensor fusion applications.

In some instances, a size of a grid to be stored in connection with a 3D map (and consequently the size of the occupancy and occlusion grid generated) can be based at least in part on a number of region characteristics. In the context of an intersection, the region characteristics can include, but are not limited to, a distance across the intersection that the autonomous vehicle must travel (e.g., in order to be clear of oncoming traffic); a speed limit of vehicles in the intersection (e.g., of oncoming traffic); a collision avoidance associated with the speed limit (e.g., to effectively increase the speed of traffic to be expected); an acceleration level and/or average velocity of the autonomous vehicle traversing the intersection distance; and the like. Thus, the occupancy and occlusion grid can be sized such that the autonomous vehicle can traverse a region when the occupancy and occlusion grid is clear of obstacles.

At 110, the system may continue to process additional sensor data to update the occupancy and occlusion grid with updated status, and/or to expand the boundaries of the scope area (or geographical area) covered by the grid. In some embodiments, an occupancy and occlusion grid can be one of a plurality of occupancy and occlusion grids that represent a detected area over a plurality of time intervals. Accordingly, as a vehicle travels through an environment and the location of the vehicle's sensors with respect to the environment change, the status of one or cells in the occupancy and occlusion grid can change. In some instances, a confidence level associated with the determination of a cell status can increase over time (e.g., by accumulating additional observations). In some instances, for a dynamically generated occupancy and occlusion grid, a lifetime of the occupancy and occlusion grid can correspond to an amount of time since the occupancy occlusion grid was instantiated. In some instances, a confidence level of the status of cells of an occupancy and occlusion grid can be based at least in part on the lifetime of the occupancy and occlusion grid.

Optionally, the system may update the occupancy and occlusion grid if the value or status of the grid cells within the score area changes over time (e.g., in the next sensor data frame) using, for example, the methods discussed above. This is because the object recognition information corresponding to each cell changes (for example, movement) as the automobile moves or the detected object moves over time. Therefore, the value of the grid cells within the scope are may be updated according to this change. As discussed above, the current disclosure allows the system to use previously calculated h information for tiles that remain within in the scope area across successive frames, by moving the entire tiles within the scope area. This may be done be creating another tile grid that caches ground height information from the tile map. The tiles densely store the height information for all levels of a given cell index to minimize the number of cache lines that must be fetched by $HAG(index_{cell}, z)$.

As such, when the grid moves, only new tiles that enter the scope area may be populated with a new value for both state and h. State information is computed based on the sensor data for each frame, including for tiles previously present within the scope area.

At 112 an autonomous vehicle may use the occupancy and occlusion grid to generate a trajectory for the vehicle as the vehicle moves in the environment corresponding to the occupancy and occlusion grid. In some embodiments, motion planning systems on autonomous vehicles can use the occupancy and occlusion grid to determine whether vehicle can traverse some area. The cells nearby a projected or assigned path may be repeatedly checked for drivability. If the path or cell is not drivable, the motion planning system may be configured to either stop for or maneuver around the non-drivable area. In some examples, where a sufficiency of information is below a threshold value (e.g., a number of occupied or occlusion cells in an environment exceeds a threshold value such that system is unable to determine a trajectory to navigate the area), the operation 112 can include commanding the vehicle to creep forward or otherwise change a location of the vehicle to gather additional information.

The system may determine a velocity and/or an acceleration level for the vehicle while traversing an environment. For example, a low velocity level can be selected for the vehicle to enter a region without traversing the entire region to move slowly along a trajectory to "see" more of a region to reduce a size of an occluded region before progressing according to nominal controls. As another example, when a region of the occupancy and occlusion grid is clear, a higher velocity or acceleration may be selected to traverse an environment. In some cases, where a size of an occlusion grid is reduced due to obstacles and/or based on limited sightlines in the environment, a high velocity can be selected to reduce an amount of time the vehicle will be exposed to oncoming traffic.

At 114 the vehicle's motion control system may cause the vehicle to move along the trajectory.

The systems and methods of this disclosure can be used in a number of scenarios. For example, the occupancy and occlusion grid of this disclosure can be used when an autonomous vehicle navigates intersections including multiple levels and is required to execute complex maneuvers, such as unprotected left turns, free right turns, entering a ramp, or negotiating complex intersections. As can be understood, in such an example, oncoming traffic may not stop at the intersection, which can present challenges in determining when an intersection can be traversed. In one example, the autonomous vehicle can approach an intersection and stop at a stop line (e.g., that has been indicated in map data). An initial grid can be accessed from a data store, and the autonomous vehicle can capture sensor data to determine the states or values of the cells to generate an occupancy and occlusion grid. In some instances, the autonomous vehicle can determine that a portion of the occupancy and occlusion grid is occluded (e.g., due to an obstacle such as a parked car) and/or lacking sufficient information to proceed. In such instances, the autonomous vehicle may slowly traverse into the intersection to change a location of its sensors in the environment. The autonomous vehicle can continue to capture sensor data to determine the occlusion state and occupancy state of some or all cells in the occupancy and occlusion grid. If other vehicles are traversing the intersection, the cells will be determined to be occupied, and the autonomous vehicle may continue to wait for an appropriate time to traverse the intersection. If there are no other vehicles traversing the intersection, and the sensors are able to make determinations of the occupancy states of the cells, the cells of the occupancy and occlusion grid will include a value that indicates that the cells are unoccupied and unoccluded, and the autonomous vehicle may traverse the intersection. As can be understood, the occupancy and occlusion grid can be used for traversing may different intersections, and is not limited to any particular intersections or maneuvers.

In another example, an autonomous vehicle may capture sensor data of an environment and can determine that an object in the environment is "blocking" the sensors from sensing a portion of the environment. In some instances, an occupancy and occlusion grid can be dynamically associated with the object. In some examples, although the autonomous vehicle may know little information about the occupancy and occlusion grid at an initial time (e.g., especially the occupancy of cells obscured by the obstacle), in some examples the autonomous vehicle can infer a context of the cells by monitoring a region where objects traverse prior to entering the occupancy and occlusion grid. For example, as the autonomous vehicle monitors an occluded region of an occupancy and occlusion grid, the autonomous vehicle can monitor for any objects (e.g., vehicles, pedestrians, etc.) entering the occlusion grid. After a period of time, if no objects have entered the occupancy and occlusion grid, and if no objects have exited the occupancy and occlusion grid, the autonomous vehicle may infer that the occupancy and occlusion grid (e.g., scope area) is unoccupied, and may execute a vehicle trajectory as appropriate.

In yet another example, an autonomous vehicle can capture sensor data of an environment to identify an object in the environment. The autonomous vehicle can associate an occupancy and occlusion grid with the object, as discussed herein. In some instances, the autonomous vehicle can also identify one or more dynamic objects, such as a pedestrian, in the environment that traversed into an occluded region of the occupancy and occlusion grid. The autonomous vehicle can monitor a track of the dynamic object prior to the object traversing into the occluded region, and can generate one or more predicted trajectories associated with the object. In some instances, the one or more predicted trajectories can be based on a measured track of the dynamic object and/or based on reasonable paths (e.g., across a crosswalk or sidewalk, a continuation of the most recent trajectory, etc.) and/or destinations in the environment. Thus, even when a dynamic object is not observed, by virtue of the object being in an occluded region, the autonomous vehicle can incorporate predicted trajectories of the dynamic objects into determinations regarding control of the autonomous vehicle. Such predicted trajectories may be later confirmed by subsequent observations based on the dynamic object remaining in the occluded region or based on the dynamic object leaving the occluded region.

In another example, the autonomous vehicle may use the occupancy and occlusion grid for traversing occlusion regions caused by topographic obstacles, such as the crest of a hill. For example, as a vehicle approaches the crest (e.g., top) of a hill, the vehicle may not be able to see the ground surface on the other side of the hill crest. In some examples, occupancy and occlusion grid can be associated with map data representing the hill region to facilitate traversing the hill. For example, the occupancy and occlusion grid can include cells that represent a three-dimensional region of space in the environment in the form of cells that have an occluded or occupied state below height h, and are unoccupied above height h. Accordingly, by determining that a portion of the cell is clear (e.g., h=0 or h above occupied/occluded cell), the autonomous vehicle can "see over" the crest of the hill to acquire information about an environment without capturing sensor data of all regions of the environment.

It should be noted that the above occupancy and occlusion grid may also be used in a collision-based application for forward monitoring control such as Adaptive Cruise Control (ACC) in autonomous vehicles as well as semi-autonomous or non-autonomous vehicles.

Figure 4:
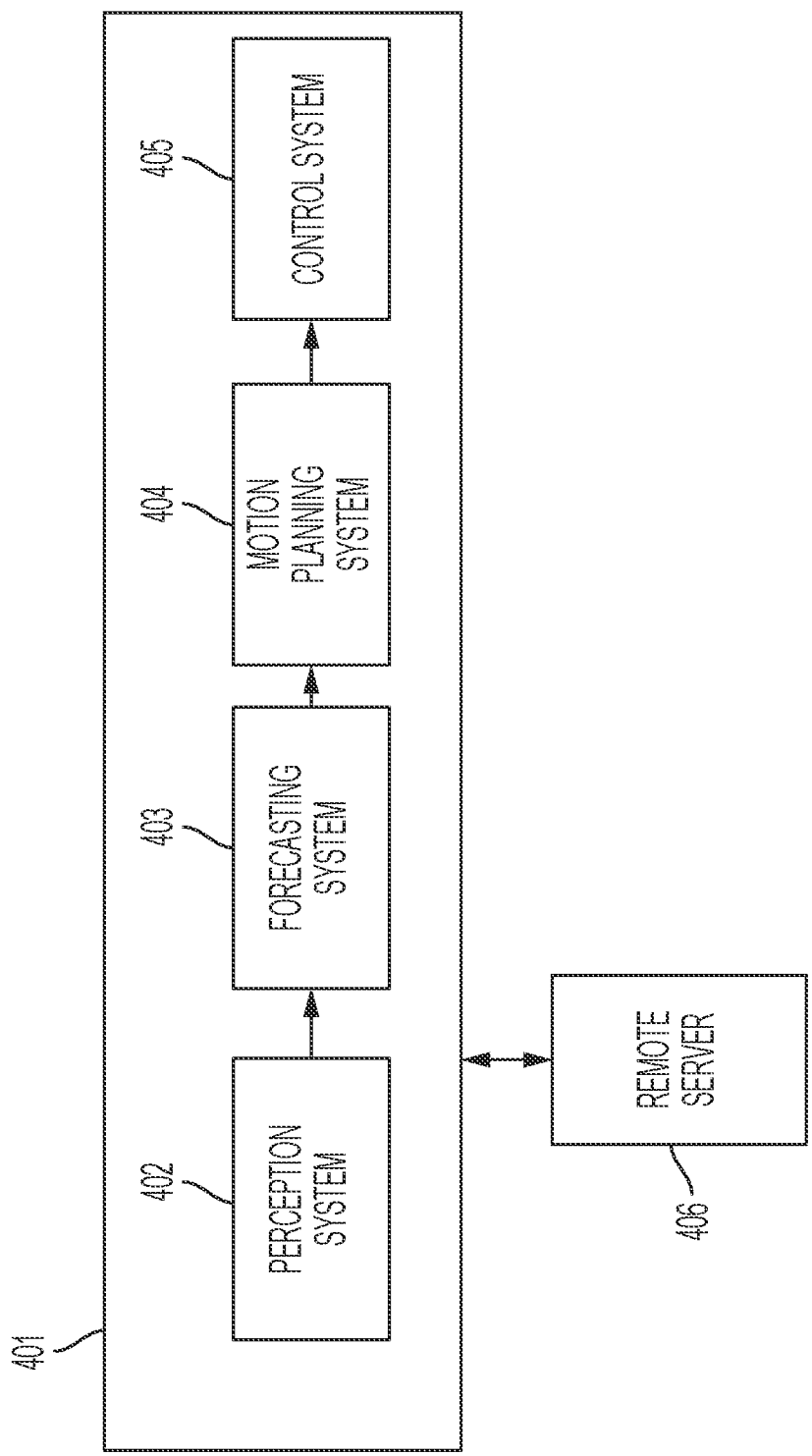
FIG. 4 is a block diagram illustrating various subsystems of an autonomous vehicle.

FIG. 4 shows a high-level overview of AV subsystems that may be relevant to the discussion above. Specific components within such systems will be described in the discussion of FIG. 5 later in this document. Certain components of the subsystems may be embodied in processor hardware and computer-readable programming instructions that are part of the AV's on-board computing system 401.

The subsystems may include a perception system 402 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies," published in *IEEE Access*, April 2020.

If the vehicle is an AV, the vehicle's perception system 402 may deliver perception data to the vehicle's forecasting system 403. The forecasting system (which also may be referred to as a prediction system) will include processors and computer-readable programming instructions that are configured to process data received from the perception system and forecast actions of other actors that the perception system detects. A typical forecast will be a trajectory, but it alternatively may be a prediction that the actor will remain still. The forecast may include other parameters that reflect actions that the actor may take as well.

In an AV, the vehicle's perception system, as well as the vehicle's forecasting system, will deliver data and information to the vehicle's motion planning system 404 and control system 405 so that the receiving systems may assess such data and initiate any number of reactive motions to such data. The motion planning system 404 and control system 405 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 14, no. 4 (April 2016).

In non-AV embodiments, such as with vehicles that are driven by human operators, the motion planning system 404 may be embodied in processor hardware and computer-readable hardware that are part of an electronic devices that is contained with the vehicle, such as an dashboard navigation system or a mobile electronic device of the operator. In such situations, the electronic device may output the trajectories planned by the motion planning system via a display, an audio speaker, or both. In addition, some parts of the perception system 402 may include a transceiver of an electronic device that receives certain perception data (such as weather data) from a remote server via wireless communication.

The vehicle's on-board computing system 401 will be in communication with a remote server 406. The remote server 406 is an external electronic device that is in communication with the vehicle's on-board computing system 401, either via a wireless connection while the vehicle is making a run, or via a wired or wireless connection while the vehicle is parked at a docking facility or service facility. The remote server 406 may receive data that the vehicle collected during its run, such as perception data and operational data. The remote server 406 also may transfer data or other information to the vehicle such as software updates, high definition (HD) map updates, machine learning model updates and other information.

Figure 5:
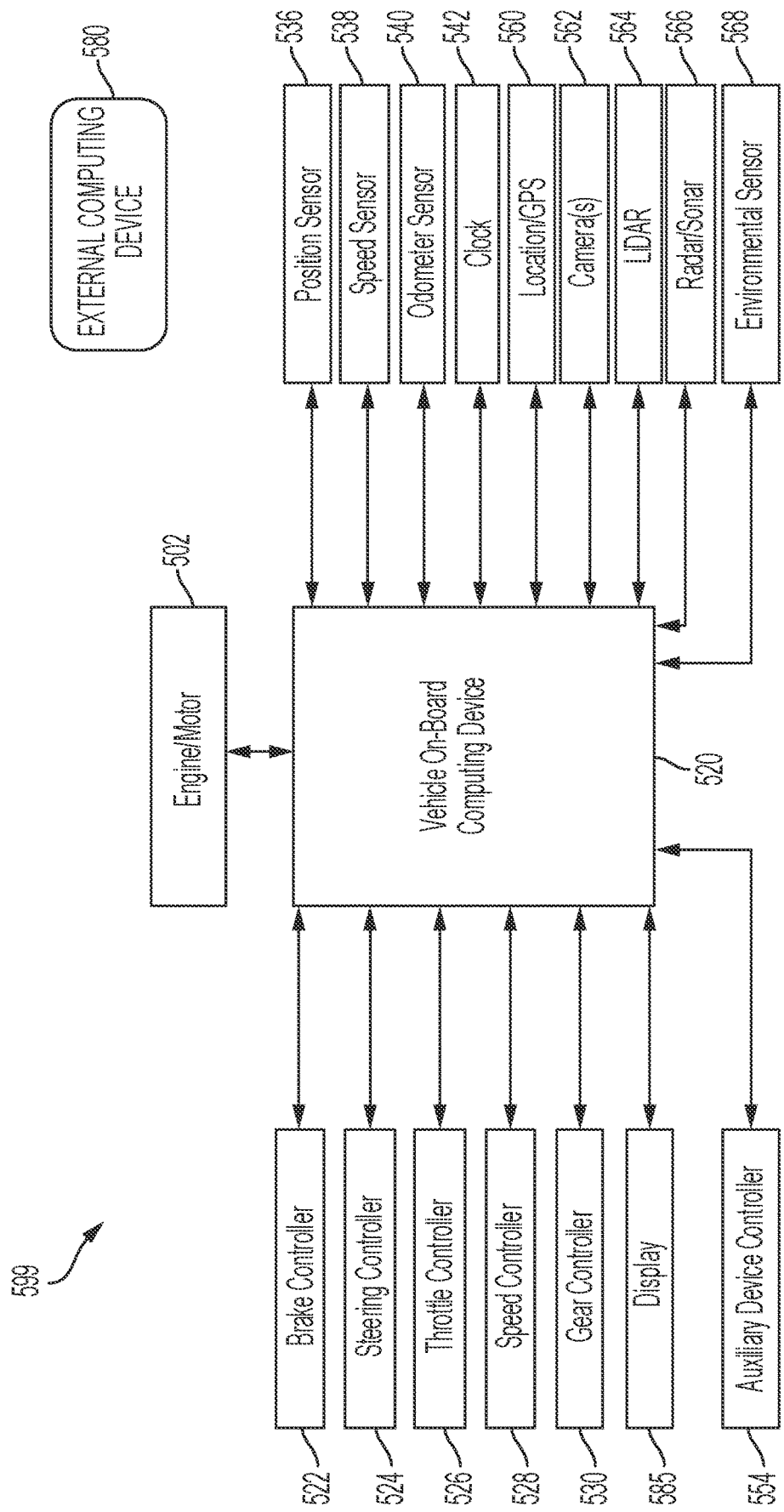
FIG. 5 an example system architecture for a vehicle.

FIG. 5 illustrates an example system architecture 599 for a vehicle, such as an AV. The vehicle includes an engine or motor 502 and various sensors for measuring various parameters of the vehicle and/or its environment. Operational parameter sensors that are common to both types of vehicles include, for example: a position sensor 536 such as an accelerometer, gyroscope and/or inertial measurement unit; a speed sensor 538; and an odometer sensor 540. The vehicle also may have a clock 542 that the system uses to determine vehicle time during operation. The clock 542 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 560 such as a global positioning system (GPS) device; object detection sensors such as one or more cameras 562; a LiDAR sensor system 564; and/or a radar and or and/or a sonar system 566. The sensors also may include environmental sensors 568 such as a precipitation sensor and/or ambient temperature sensor. The object detection sensors may enable the vehicle to detect moving actors and stationary objects that are within a given distance range of the vehicle 599 in any direction, while the environmental sensors collect data about environmental conditions within the vehicle's area of travel. The system will also include one or more cameras 562 for capturing images of the environment. Any or all of these sensors will capture sensor data that will enable one or more processors of the vehicle's on-board computing device 520 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 520. The on-board computing device 520 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 520 may control braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); one or more auxiliary device controllers 854; and/or other controllers.

Geographic location information may be communicated from the location sensor 560 to the on-board computing device 520, which may then access a map of the environment that corresponds to the location information to determine known fixed features of the environment such as streets, buildings, stop signs and/or stop/go signals. Captured images from the cameras 562 and/or object detection information captured from sensors such as a LiDAR system 564 is communicated from those sensors) to the on-board computing device 520. The object detection information and/or captured images may be processed by the on-board computing device 520 to detect objects in proximity to the vehicle 500. In addition or alternatively, the AV may transmit any of the data to an external computing device 580 for processing. Any known or to be known technique for performing object detection based on sensor data and/or captured images can be used in the embodiments disclosed in this document.

In addition, the AV may include an onboard display device 585 that may generate and output interface on which sensor data, vehicle status information, or outputs generated by the processes described in this document are displayed to an occupant of the vehicle. The display device may include, or a separate device may be, an audio speaker that presents such information in audio format.

Figure 6:
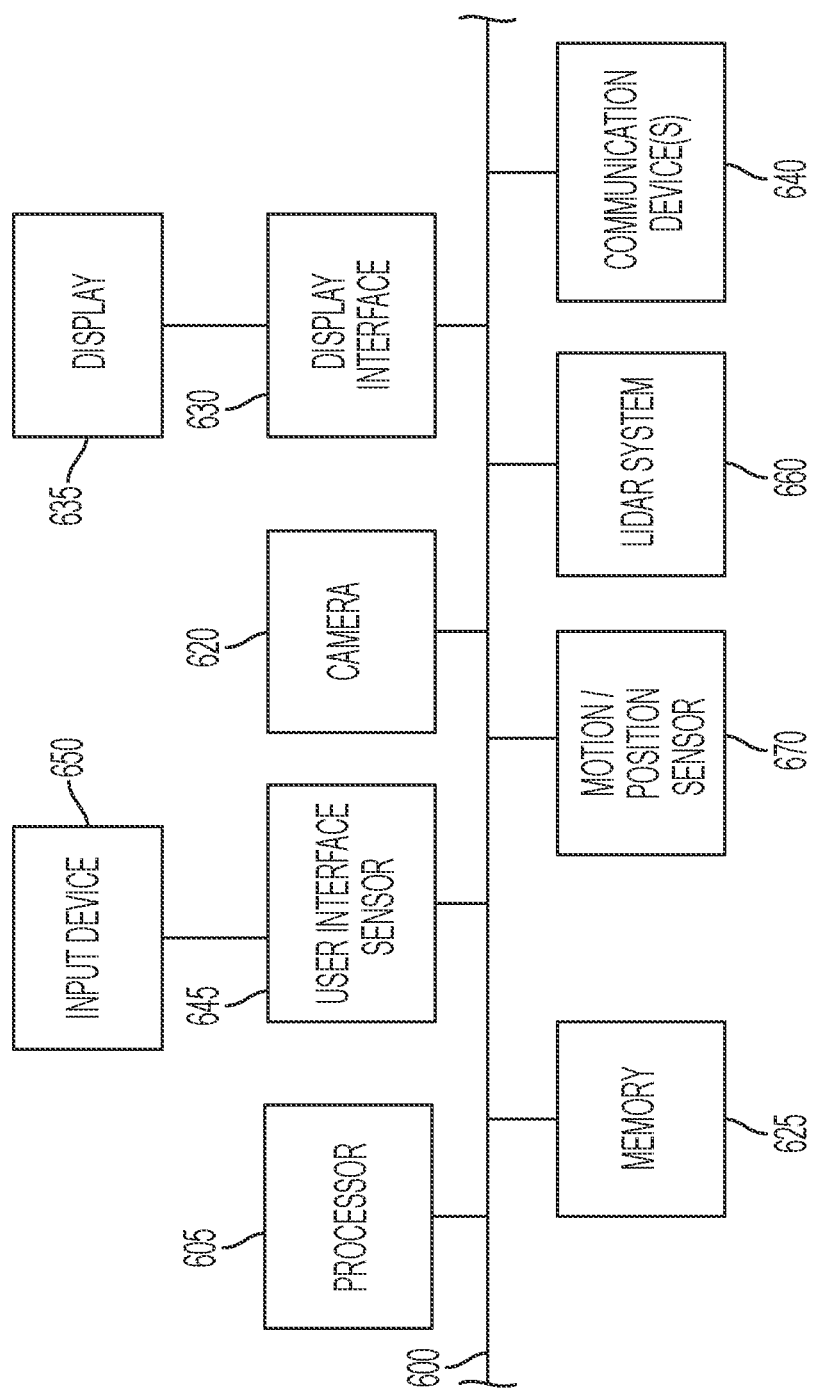
FIG. 6 is a block diagram that illustrates various elements of a possible electronic subsystem of vehicle and/or external electronic device.

FIG. 6 depicts an example of internal hardware that may be included in any of the electronic components of the system, such as the onboard computing device of the AV, external monitoring and reporting systems, or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format, such as an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may include and receive data via a LiDAR system 660, when used in the context of autonomous vehicles.As described above, this document describes methods for generating an occupancy and occlusion grid of a geographic area. The method may be executed by a processor, or by system that includes the processor and a computer-readable medium containing programming instructions to implement the method. Optionally, the system may be part of a vehicle. Some embodiments also include computer program products with programming instructions that are configured to cause a processor to implement the method.

In various embodiments, the method may include acquiring a 3D map of a geographic area comprising a plurality of height levels. The 3D map may include a plurality of tiles, each of which provides ground height information for one or more of the plurality of levels. The method may include generating a grid corresponding to the 3D map. The grid may divide each of the plurality of tiles into a plurality of cells, The grid may include: (a) a unique index assigned to each of the plurality of cells, in which the unique index is convertible to an index of a tile of the 3D map in which that cell is included; and (b) a plurality of gridlets associated with each of the plurality of cells, wherein a number of the plurality of gridlets associated with a cell is equal to a number of height levels represented by a tile of the 3D map in which that cell is included. The method also may include saving the grid to a map data set.

Optionally, the method may include, by a vehicle, using the grid to generate an occupancy and occlusion grid by: (a) receiving, from one or more sensors of the a vehicle, a point cloud comprising a plurality of impact points corresponding to a portion of the grid, wherein each of the plurality of impact points comprises a location having z-coordinate with respect to the geographic area; (b) identifying at least one cell of the portion of the grid that includes an impact point; and (c) assigning an occupied state to the at least one cell, the occupied state being indicative of an object being present in the at least one cell.

Optionally, the method also may include, by the vehicle using a z-coordinate of the impact point and a unique index of the at least one cell, identifying a height above ground (HAG) for the at least one cell, wherein the HAG is indicative of a height below which the at least one cell is occupied.

Optionally, the method also may include, by the vehicle, resolving conflicts between two or more HAGs identified for the at least one cell by using a maximum value of the two or more HAGs.

Optionally, the method also may include, by the vehicle: (a) identifying a ray between the impact point and an origin point; and (b) assigning, to one or more cells traversed by the ray, an occluded state. The occluded state may be indicative of the one or more sensors not receiving information about occupancy of the one or more cells.

Optionally, the method also may include, by the vehicle: (a) identifying, using a location of the origin point and a location of the impact point, a height of the ray in each of the one or more cells; and (b) identifying, for each of the one or more cells, using a height of the ray in that cell and a unique index of that cell, a height above ground (HAG) for that cell, wherein the HAG is indicative of a height below which that cell is occluded.

Optionally, the method also may include, by the vehicle, resolving conflicts between two or more HAGs identified for that cell by using a minimum value of the two or more HAGs.

Optionally, in any of the embodiments above, the origin point may be a location of the vehicle in the geographical area.

Optionally, in any of the embodiments above, the also may include caching the HAG for all levels of a given cell index, and using the cached HAD for updating the occupancy and occlusion grid for another portion of the grid.

Optionally, in any of the embodiments above, the origin point may be a location of the vehicle in the geographical area.

Optionally, in any of the embodiments above, the also may include using the occupancy and occlusion grid to identify a trajectory for a vehicle as the vehicle moves in the geographic area.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terms that are relevant to the disclosure above include:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions.

Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device on which programming instructions are stored.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated.

The invention claimed is:

1. A method of generating an occupancy and occlusion grid of a geographic area, the method comprising, by a processor:
   acquiring a 3D map of a geographic area comprising a plurality of height levels, wherein the 3D map comprises a plurality of tiles, each tile providing ground height information for one or more of the plurality of height levels;
   generating a grid corresponding to the 3D map that divides each of the plurality of tiles into a plurality of cells, the grid comprising:
      a unique index assigned to each of the plurality of cells, the unique index convertible to an index of a tile of the 3D map in which that cell is included, and
      a plurality of gridlets associated with each of the plurality of cells, wherein a number of the plurality of gridlets associated with a cell is equal to a number of height levels represented by a tile of the 3D map in which that cell is included;
   saving the grid to a map data set;
   identifying, using the occupancy and occlusion grid, a trajectory for a vehicle as the vehicle moves in the geographic area; and
   causing the vehicle to travel along the trajectory.

2. The method of claim 1, further comprising generating, using the grid, an occupancy and occlusion grid by:
   receiving, from one or more sensors of a vehicle, a point cloud comprising a plurality of impact points corresponding to a portion of the grid, wherein each of the plurality of impact points comprises a location having z-coordinate with respect to the geographic area;
   identifying at least one cell of the portion of the grid that includes an impact point; and
   assigning an occupied state to the at least one cell, the occupied state being indicative of an object being present in the at least one cell.

3. The method of claim 2, further comprising identifying, using a z-coordinate of the impact point and a unique index of the at least one cell, a height above ground (HAG) for the at least one cell, wherein the HAG is indicative of a height below which the at least one cell is occupied.

4. The method of claim 3, further comprising resolving conflicts between two or more HAGs identified for the at least one cell by using a maximum value of the two or more HAGs.

5. The method of claim 3, further comprising:
identifying a ray between the impact point and an origin point; and
assigning, to one or more cells traversed by the ray, an occluded state, the occluded state being indicative of the one or more sensors not receiving information about occupancy of the one or more cells.

6. The method of claim 5, further comprising:
identifying, using a location of the origin point and a location of the impact point, a height of the ray in each of the one or more cells; and
identifying, for each of the one or more cells, using a height of the ray in that cell and a unique index of that cell, a height above ground (HAG) for that cell, wherein the HAG is indicative of a height below which that cell is occluded.

7. The method of claim 6, further comprising resolving conflicts between two or more HAGs identified for that cell by using a minimum value of the two or more HAGs.

8. The method of claim 6, further comprising:
caching the HAG for all levels of a given cell index; and
using the cached HAD for updating the occupancy and occlusion grid for another portion of the grid.

9. The method of claim 5, wherein the origin point is a location of the vehicle in the geographical area.

10. A system for generating an occupancy and occlusion grid of a geographic area, the system comprising:
a processor; and
a memory containing programming instructions that are configured to, when executed, cause the processor to:
acquire a 3D map of a geographic area comprising a plurality of height levels, wherein the 3D map comprises a plurality of tiles, each tile providing ground height information for one or more of the plurality of height levels, and
generate a grid corresponding to the 3D map that divides each of the plurality of tiles into a plurality of cells, the grid comprising:
a unique index assigned to each of the plurality of cells, the unique index convertible to an index of a tile of the 3D map in which that cell is included, and
a plurality of gridlets associated with each of the plurality of cells, wherein a number of the plurality of gridlets associated with a cell is equal to a number of height levels represented by a tile of the 3D map in which that cell is included, and
save the grid to a map data-set set,
identify, using the occupancy and occlusion grid, a trajectory for a vehicle as the vehicle moves in the geographic area, and
causing the vehicle to travel along the trajectory.

11. The system of claim 10, further comprising programming instructions to generate, using the grid, an occupancy and occlusion grid by:
receiving, from one or more sensors of a vehicle, a point cloud comprising a plurality of impact points corresponding to a portion of the grid, wherein each of the plurality of impact points comprises a location having z-coordinate with respect to the geographic area;
identifying at least one cell of the portion of the grid that includes an impact point; and
assigning an occupied state to the at least one cell, the occupied state being indicative of an object being present in the at least one cell.

12. The system of claim 11, further comprising programming instructions to identify, using a z-coordinate of the impact point and a unique index of the at least one cell, a height above ground (HAG) for the at least one cell, wherein the HAG is indicative of a height below which the at least one cell is occupied.

13. The system of claim 12, further comprising programming instructions to resolve conflicts between two or more HAGs identified for the at least one cell by using a maximum value of the two or more HAGs.

14. The system of claim 13, further comprising programming instructions to:
identify a ray between the impact point and an origin point; and
assign, to one or more cells traversed by the ray, an occluded state, the occluded state being indicative of the one or more sensors not receiving information about occupancy of the one or more cells.

15. The system of claim 14, further comprising programming instructions to:
identify, using a location of the origin point and a location of the impact point, a height of the ray in each of the one or more cells; and
identify, for each of the one or more cells, using a height of the ray in that cell and a unique index of that cell, a height above ground (HAG) for that cell, wherein the HAG is indicative of a height below which that cell is occluded.

16. The system of claim 14, wherein the origin point is a location of the vehicle in the geographical area.

17. The system of claim 10, wherein the processor and memory are components of the vehicle.

18. A computer program product comprising a memory a memory containing programming instructions that are configured to, when executed, cause a processor to:
acquire a 3D map of a geographic area comprising a plurality of height levels, wherein the 3D map comprises a plurality of tiles, each tile providing ground height information for one or more of the plurality of levels, and
generate a grid corresponding to the 3D map that divides each of the plurality of tiles into a plurality of cells, the grid comprising:
a unique index assigned to each of the plurality of cells, the unique index convertible to an index of a tile of the 3D map in which that cell is included, and
a plurality of gridlets associated with each of the plurality of cells, wherein a number of the plurality of gridlets associated with a cell is equal to a number of height levels represented by a tile of the 3D map in which that cell is included; and
save the grid to a map data set,
identify, using the occupancy and occlusion grid, a trajectory for a vehicle as the vehicle moves in the geographic area, and
causing the vehicle to travel along the trajectory.

* * * * *